March 17, 1925.  1,530,412
A. RIDD
MILKING MACHINE
Filed May 23, 1923
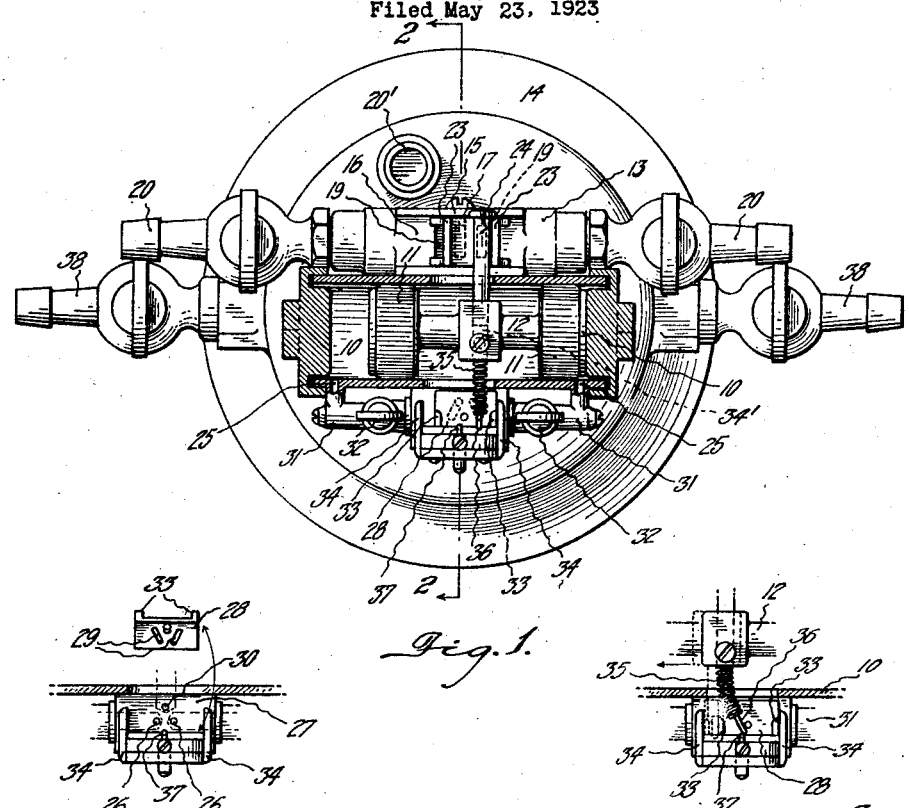
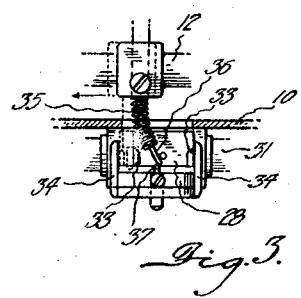
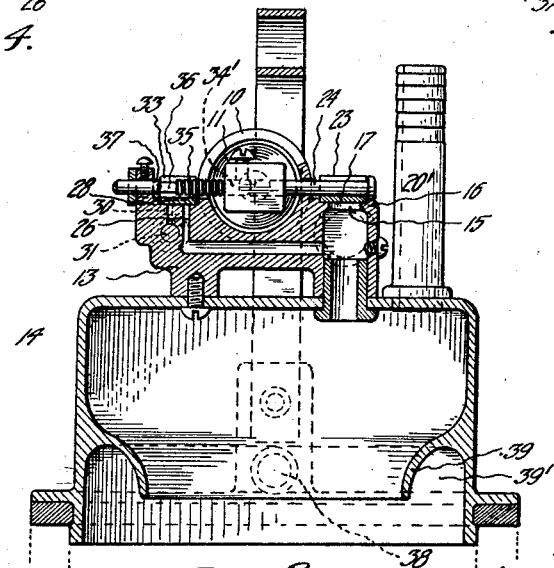
Inventor.
A. Ridd Patented Mar. 17, 1925.

1,530,412

UNITED STATES PATENT OFFICE.

AMBROSE RIDD, OF MELBOURNE, VICTORIA, AUSTRALIA, ASSIGNOR TO THE RIDD COMPANY LIMITED, OF NEW PLYMOUTH, NEW ZEALAND.

MILKING MACHINE.

Application filed May 23, 1923. Serial No. 640,986.

*To all whom it may concern:*

Be it known that AMBROSE RIDD, subject of the King of Great Britain, residing at 167-169 King Street, Melbourne, Victoria, Australia, formerly of 495 Bourke Street, Melbourne, Victoria, Australia, has invented certain new and useful Improvements in Milking Machines, of which the following is a specification.

This invention relates to improvements in milking machines and refers especially to milking machinery of the type wherein vacuum is employed in connection with the pulsation of inner flexible linings of the teat cups.

The object of the invention is to provide simple and efficient improvements in the pulsator of milking machines whereby milking operations can be more satisfactorily performed and without subjecting the teats or udders of cows to injury. The invention is equally applicable to systems wherein the milk drawn from a single cow is delivered to a milk pail as it is to those systems wherein the milk drawn from a number of cows is passed through a common pipe to a single container.

I accomplish the above mentioned object by providing a pulsator having a double piston which is mounted to reciprocate in opposed cylinders and carries a flexible arm adapted at each stroke of the said pistons to actuate a slide or an oscillating valve to open and close ports through which air is alternately withdrawn from and admitted to the said cylinders, and wherein the piston rod is fitted with an arm or pin adapted to actuate a reciprocating slide valve covering ports in a valve seat on the side of the cylinder to alternately place the vacuum pipes of a milk claw in communication with a source of vacuum and with the atmosphere to produce pulsations in the teat cups.

In order that the invention may be readily understood reference will now be had to the accompanying sheets of explanatory drawings wherein—

Figure 1 is a view in plan of a lid of a milk pail (with the handle removed) fitted with a pulsator constructed in accordance with the invention; the opposed cylinders being shown in section.

Figure 2 is a view in sectional elevation taken on the dotted line 2—2 of Figure 1.

Figure 3 is a detail view showing the valve for opening and closing the ports leading to the cylinders and the means for actuating the same.

Figure 4 is a view showing the valve raised from its seat.

In these drawings the reference numeral 10 designates opposed cylinders having their inner ends open to the atmosphere and accommodating a pair of pistons 11 which are connected by a rigid piston rod 12.

The cylinders 10 are mounted on a frame 13 which can be fitted to the lid 14 of a milk pail or receiver or arranged in the pipe line of a milking system (not shown).

A port 15 in the frame at one side of the cylinders is arranged in communication with a source of vacuum (as the interior of the pail which is connected to a vacuum chamber, not shown) and opens into the centre of a slide 16 having a reciprocating slide valve 17 mounted thereon.

The reciprocating valve 17 is arranged to place the said port 15 alternately in communication with ports 19 located on both sides thereof and these outer ports are in communication with connections 20 for pipes 21 leading to claws 22 of teat cups whereby the pulsations are communicated to the space between the flexible lining and the casing of the said teat cups.

The reciprocating valve 17 is provided with a pair of upwardly projecting flanges 23 or studs and a rigid arm 24 projects laterally from the piston rod 12 and lies between the said flanges or studs. The distance between the flanges is such that when the pistons are reaching the ends of their stroke in both directions the arm will strike against one of the flanges and cause the valve to be moved to place the centre port in communication with the outer port nearest to the said arm.

The movement of the pistons 11 causes the reciprocating valve 17 to be actuated to alternately place the space between the flexible lining and the casing of a teat cup in communication with the source of vacuum and the atmosphere.

The outer ends of the cylinders 10 are provided with ports 25 which are arranged in communication with ports 26 formed in a seat 27 of a slide valve 28 located on the opposite side of the cylinders to that on which the reciprocating valve 17 is situated.

The underside of the valve 28 is provided with two converging recesses 29 which are so arranged that at the limit of its movement in both directions one or other of the ports 26 in the seat will be placed in communication with an intermediately positioned port 30 communicating with the interior of the milk pail or a source of vacuum. When the valve 28 has moved to place one of the cylinders 10 in communication with the source of vacuum the opposite cylinder is in communication with the atmosphere through the uncovering of its respective port 26 and vice versa. This arrangement of slide valve avoids the crossing of the ports to each end of the cylinder as is usual in most constructions. The passage 31 leading from the ports 25 in the ends of the cylinders to the outer ports 26 in the seat of the valve 28 can be provided with valves or taps 32 for regulating the size of or closing the same and thereby controlling the rate of pulsation as and when required.

The pistons move toward the end of the cylinder which is placed in communication with the source of vacuum when the atmosphere is free to enter the opposite end of the said cylinder.

The ends of the valve 28 are provided with upwardly projecting flanges 33 which are adapted to abut against adjustable or fixed stops 34 when the said valve reaches the limit of its movement in both directions and the central port 30 is in communication with one of the outer ports 26.

A flexible arm projects laterally from the piston rod 12 and the inner end of the said arm may consist of a pin 34′ which is rigidly or adjustably fitted to the piston rod and the centre part may consist of a flat or helically coiled spring 35 having a flat blade-like member or striking piece 36 fitted to the outer end thereof.

The outer end 36 of the flexible arm strikes against an adjustable stop 37 when the pistons are moved endwise in the cylinder, and the flexible part 35 is bent sufficiently to enable the said outer end to pass over the face of the said stop.

When the arm passes the stop 37 it straightens rapidly and in doing so strikes against the upwardly projecting flanges 33 or stud on the valve 28 at the other side of the said stop and causes the said valve to move on its seat to place the opposite cylinder in communication with the source of vacuum.

The adjustable stop 37 can be set to cause the arm to flex more or less in passing the same thereby causing the said arm to actuate the valve later or earlier in the stroke of the pistons and strike with more or less force the flange 33 or stud on the other side of the adjustable stop.

The valve 28 for opening and closing the ports leading to the ends of the cylinders can be arranged to oscillate instead of slide on the seat 27. In this case the valve can be made in the form of a disc having a pin depending from the centre thereof and pivoting in a hole in the framing. The underside of the oscillating valve is recessed as above described to place the intermediately positioned port 30 in communication with the outer ports 26 when the valve is oscillated by the flexible arm. The oscillating valve is formed with upwardly projecting flanges or studs against which the flexible arm is adapted to strike when it passes the centrally disposed stop 37. Apart from the valve having an oscillating movement it operates precisely as the slide valve above described.

When the pulsator is used in connection with a milk pail or bucket, the lid or cover of the latter is made removable and fitted with connections 20′ and 38 to which the pipes or tubes of a vacuum pump (not shown) and milk pipe of teat cup claws are attached, respectively. The lid or cover 14 of the milk pail or receiver is formed with an inner downwardly projecting flange 39 forming an annular space 39′ into which the milk pipes 38 discharge. This flange 39 projects downward to a certain extent so that as the milk in the pail rises to the level of the lip of the same it cuts off the vacuum from the teat cups and thus avoids over-filling of the pail or receiver.

I claim:—

1. In a milking machine, a pulsator including a pair of cylinders, pistons operating therein, a rod rigidly connecting the pistons, the cylinders having opposed ports arranged therebetween, valve seats formed about the ports, conduits connected with the ports and having branches, one set of branches communicating with the source of vacuum and the atmosphere and the other set with the outer ends of the cylinders, slide valves operating in the conduits and coacting with the ports, a rigid arm extending from the rod and connected with one of the slide valves, and a flexible arm between the rod and other valve, substantially as and for the purposes set forth.

2. In a milking machine, a pulsator having a pair of opposed cylinders, a pair of pistons reciprocatingly mounted in the cylinders, a rigid rod connecting the pistons, a flexible valve controlling arm adjustably secured to the centre and projecting from one side of the piston rod, and a stop located in the path of the end of the flexible arm to cause the arm to flex and be released suddenly when the pistons are nearing the ends of their stroke in both directions.

3. In a milking machine pulsator, a frame, a pair of opposed cylinders on the frame, a double piston adapted to reciprocate in the cylinders, a rigid rod connecting the pistons, slide valves mounted on seats on opposite sides of the cylinders, a central port in one seat communicating with a source of vacuum and outer ports communicating with the outer ends of the cylinders, the valve having recesses for placing the central port alternately in communication with the outer ports, a flange on each side of the valve, an adjustable stop on the outer side of the valve seat midway of the travel of said valve, and a flexible arm on the piston rod adapted to contact with the stop and flex to pass the same and when released to actuate the valve as the pistons are nearing the end of their stroke in either direction.

4. In a milking machine pulsator, a pair of opposed cylinders, a pair of pistons reciprocatingly mounted in the cylinders, a rigid rod connecting the pistons, a flexible valve controlling arm adjustably secured to the piston rod, said arm comprising an inner rigid stem, a central flexible part formed of helically coiled spring wire, and a blade like outer end.

5. In a milking machine, a pulsator comprising a pair of opposed cylinders, a pair of pistons mounted to reciprocate in the cylinders, a connecting rod between the pistons, a valve seat adjacent to one side of the cylinders, ports in the valve seat, passages connecting the ports to the outer ends of the respective cylinders, an intermediately disposed port in the valve seat in communication with a source of vacuum, a valve on the seat having flanges at the ends thereof and adapted to place the cylinders alternately in communication with the vacuum and the atmosphere, a flexible arm on the piston rod, an adjustable stop in the path of movement of said arm, a pulsating slide valve on the opposite side of the cylinders, a pin on the piston rod adapted to actuate the said valve, and pipe connections arranged in communication with ports in the seat of the pulsating slide valve.

6. In a milking machine as claimed in claim 5 valves or taps for controlling the sizes of the passages leading to the outer ends of the cylinders.

7. In a milking machine, as claimed in claim 5, a can lid supporting the pulsator, a passage passing from a central port in the seat of the pulsating slide valve to the inside of the lid, a passage between the first-mentioned passage and the central port in the valve seat on the opposite side of the cylinder, a pipe for connecting a source of vacuum to the top of the lid, an inwardly and downwardly projecting flange on the inside of the lid, and pipe connections communicating with the annular space between the flange and the sides of the lid.

8. In a milking machine, a pulsator having a pair of opposed cylinders, a pair of pistons mounted to reciprocate in the cylinders, a connecting rod between the pistons, a flexible arm projecting from one side of the connecting rod, an adjustable stop in the path of movement of the end of the flexible arm, a valve seat having outer ports arranged in communication with the cylinders and with a central port arranged in communication with a source of vacuum, a valve actuated by the release of the arm in passing over the stop for alternately placing each of the outer ports in communication with the central port, a rigid arm projecting from the opposite side of the connecting rod, another valve seat having a central and two outer ports, a valve adapted to be actuated by the movement of the rigid arm to place the centre port of the last mentioned valve seat alternately in communication with each of the outer ports thereof, and pipe fittings arranged to place the outer ports in communication with a milk claw.

In testimony whereof I affix my signature.

AMBROSE RIDD.

Witnesses:
CLAUD HACK,
BERTHA R. CLARKE.